United States Patent [19]

Silvon

[11] 4,023,445
[45] May 17, 1977

[54] SHEET METAL FILE GUIDE

[75] Inventor: Kay Silvon, Portland, Oreg.

[73] Assignee: Omark Industries, Inc., Portland, Oreg.

[22] Filed: Oct. 1, 1975

[21] Appl. No.: 618,480

[52] U.S. Cl. .................................. 76/36; 7/17; 15/105; 33/202
[51] Int. Cl.² .................. B23D 63/10; B25F 1/00
[58] Field of Search .................. 76/25 A, 36, 74; 33/202; 15/105, 236 R; 7/17; 30/169

[56] References Cited

UNITED STATES PATENTS

| | | | |
|---|---|---|---|
| 2,827,697 | 3/1958 | Woodel | 30/169 X |
| 3,055,238 | 9/1962 | Hazzard | 76/25 A |
| 3,283,615 | 11/1966 | Kephart | 76/36 |
| 3,338,116 | 8/1967 | McLean | 76/25 A |
| 3,670,600 | 6/1972 | Arff | 76/25 A X |
| 3,905,118 | 9/1975 | Ballew | 76/25 A X |
| 3,935,757 | 2/1976 | Granberg | 33/202 X |

FOREIGN PATENTS OR APPLICATIONS 587,303  11/1959  Canada ........................ 76/25 A Primary Examiner—Al Lawrence Smith
Assistant Examiner—Nicholas P. Godici
Attorney, Agent, or Firm—Robert L. Harrington

[57] ABSTRACT

A flat sheet metal plate defining a reference plane on one side. Said plate having first and second sections and an intermediate section. The first and second sections being flat and in a common plane, and the intermediate section formed into a semi-circular loop with a center portion of the loop removed. The remaining portions of the semi-circular loop provide a pair of guide lugs to guide a round file. The first and second sections are adapted to rest on the depth gauge and cutter of a cutting link in a saw chain with the guide lugs straddling the chain and aligned with the gullet of a cutting link to guide the file in a desired orientation against the cutting edge of the cutting link.

5 Claims, 9 Drawing Figures

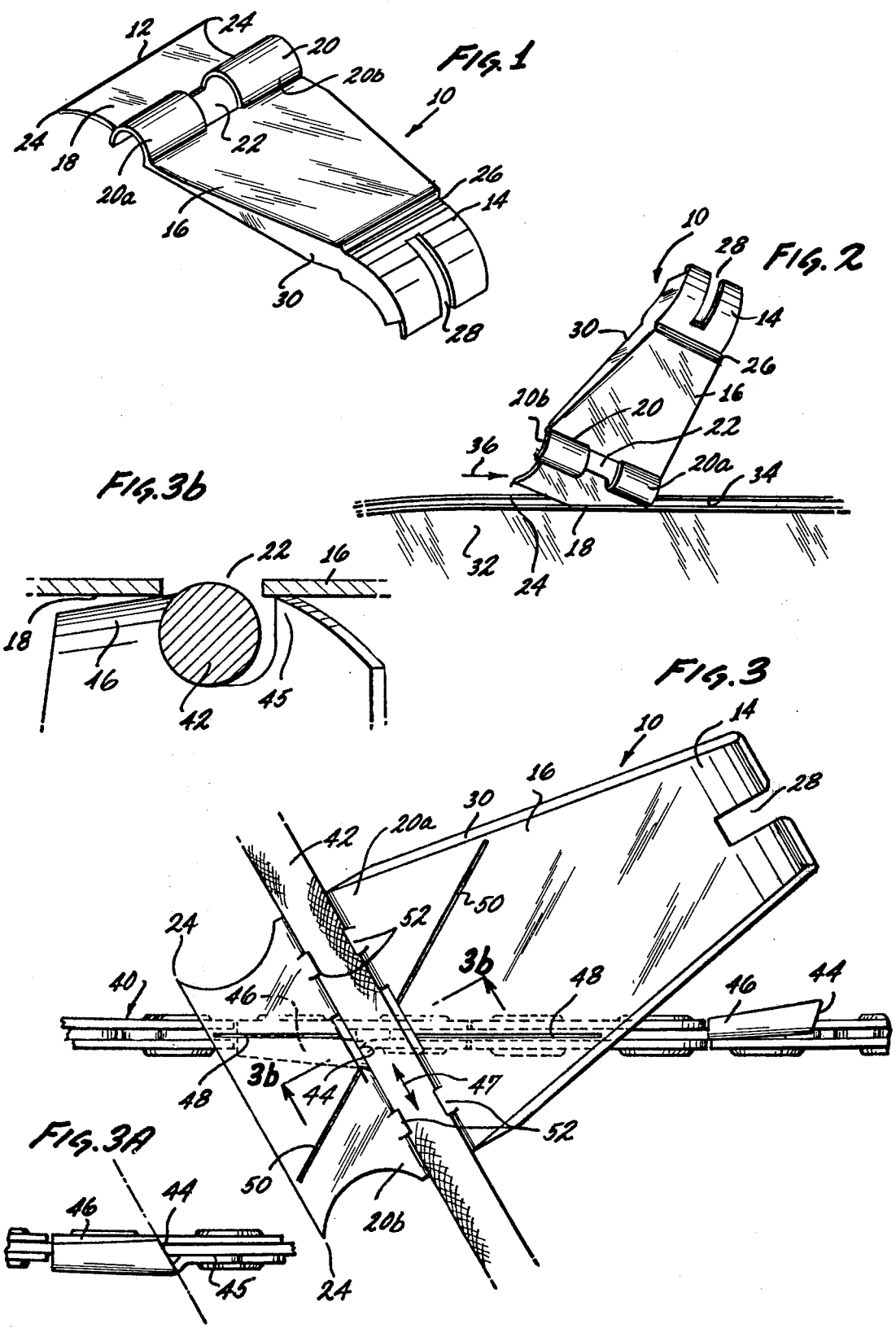

# SHEET METAL FILE GUIDE

HISTORY OF INVENTION

This invention relates to a file guide for saw chain for guiding a round file to thereby aid the user in controlling the filing of the saw chain.

This invention is an improvement to the commonly assigned invention of James S. Ballew, subject of U.S. Pat. No. 3,905,118 issued Sept. 16, 1975. The Ballew file guide introduced a greatly simplified concept for chain saw users to sharpen saw chain cutting links. The present invention uses the concept of the Ballew invention, but incorporates that concept into a simplified structure. Thus, rather than molding a plastic member with the required reference plane and guide lugs, the present invention produces these elements out of fabricated sheet metal. A semi-circular loop section is formed in a flat plate separating the plate into two spaced flat sections. The center portion of this loop section is removed for exposing the cutting edge of a saw chain cutting link and the remaining outer portions of the loop section provide the guide lugs for the file.

Whereas the above brief description generally describes the invention, a more complete understanding will be received by reference to the following detailed description and drawings wherein:

FIG. 1 is a perspective view of a device illustrating one embodiment of the invention which includes several useful chain maintenance features;

FIG. 2 illustrates the device of FIG. 1 being used as a bar groove cleaner;

FIGS. 3, 3a and 3b illustrate the device of FIG. 1 being used as a file guide;

Figure 4:
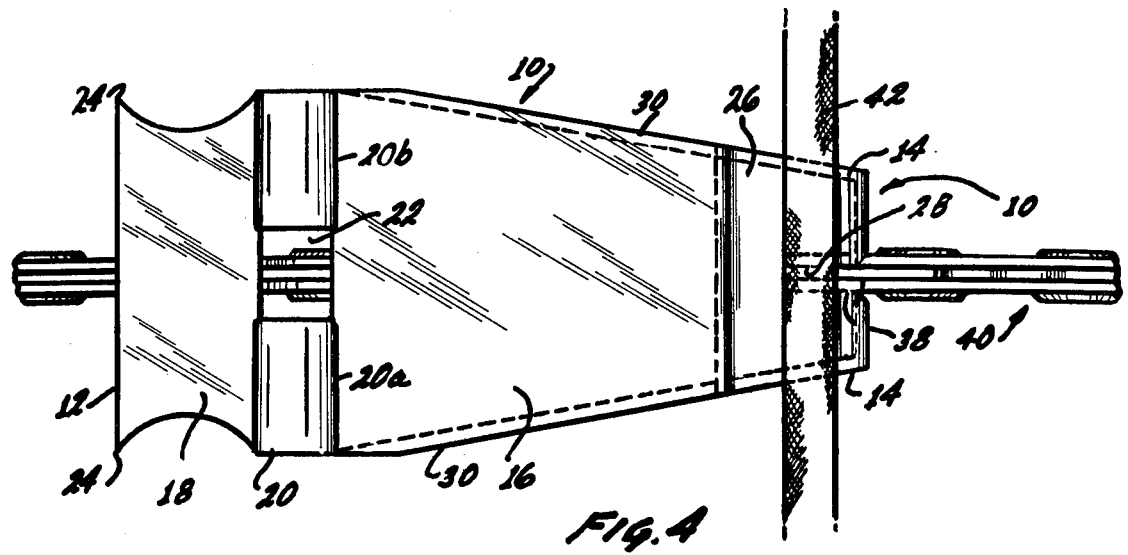
FIG. 4 illustrates the device of FIG. 1 being used as a depth gauge setter.

FIG. 1 of the drawings illustrates a chain saw accessory tool 10 in accordance with this invention which is basically a file guide with one end portion 12 that functions as a bar groove cleaner and the other end 14 that functions as a gauge for setting the height of a depth gauge provided on the cutting link of a saw chain. The tool 10 includes a flat plate portion separated into a first flat plate section 16, a second flat plate section 18, and an intermediate semi-circular loop section 20. The section 20 has a center opening 22 with the remaining side loop sections forming lugs 20a and 20b. The end 12 of the tool is flared to form points 24. The end 14 is offset from the main flat portion to form a depression 26 and then is curved or rounded. A slot 28 is provided for receiving a depth gauge of the saw chain and side skirts 30 are formed to stiffen the structure.

FIG. 2 of the drawings illustrates the tool in use as a bar groove cleaner. A guide bar 32 for guiding saw chain on a chain saw has a groove 34 formed in its edge which is adapted to receive depending drive tangs of a saw chain. This groove becomes filled with sawdust and dirt and must be periodically cleaned. As shown in FIG. 2, the saw chain is removed and the end 12 of the tool is forced along the groove to remove this sawdust and dirt as indicated by directional arrow 36.

FIG. 3 illustrates the tool 10 used as a file guide. The tool is inverted from the position of FIG. 1 so that the curved end 14 projects upwardly with respect to the saw chain 40, i.e., toward the viewer of FIG. 3. The tool is lined up so that a file 42 when placed in the channel formed by lugs 20a and 20b is aligned with the cutting edge 44 of the cutting link 46 of the saw chain 40. Whereas this cutting link 46 is shown in phantom lines in FIG. 3, FIG. 3a shows the cutter 46 and the cutting edge 44 relative to the orientation of the file 42. As seen in FIG. 3b, the underside of plate section 18, at the edge of opening 22 rests on the cutter 46 while the underside of plate section 16 rests on the depth gauge tip 45.

Directional lines 48 and 50 are provided on the top of the tool (as viewed in FIG. 3) to assist the user in aligning the file with this cutting edge. The tool is positioned so as to align line 48 with the saw chain for filing the right hand cutter as illustrated, whereas line 50 is aligned with the saw chain when filing a left hand cutter, i.e., on the other side of the saw chain. Also as shown, the center opening 22 is positioned over the chain with the file 42 nested in the gullet between the cutting edge and depth gauge. The lugs are larger than the gullet opening and restrict the tool in moving laterally relative to the chain, and the file within the gullet prevents movement of the tool along the chain axis. With the center portion of the loop removed, the cutting edge 44 of the cutting link 46 is exposed to the file and sliding the file back and forth within the lugs (and against the cutting edge 44) as indicated by arrow 47 sharpens the cutting edge 44. Whereas the file can be merely held down in the channel formed by the lugs, it has been found more convenient to form tabs 52 which hold the file against being lifted out of the loop 20.

FIG. 4 of the drawings illustrates the tool in use as a depth gauge setter. It will be understood that it is desirable that the height of the depth gauge be maintained at a specific setting below the height of the cutting edge that it precedes. Whereas the depth gauge is properly set when the chain is new, as the cutters are sharpened the height of the cutter is lowered. Thus periodically it is necessary to lower the height of the depth gauge. As seen in FIG. 4 the tool 10 is inverted as compared with FIG. 3 and laid lengthwise along the chain. The length of the tool is such that it spans across two cutters which form a reference plane below which the depth gauge is to be set. The depression 26 formed in end 14 conforms to the desired setting so that with the depth gauge 38 projected into the slot 28, the portion of the depth gauge extended above the tool end 14 should be removed to achieve the desired setting. The curve in the end of the tool has a dual purpose. The leading edge of the depth gauge is normally curved to produce a camming effect and prevent the depth gauge from digging in. If the depth gauge were merely maintained flat, the camming effect would be reduced or lost. Thus filing off all of the depth gauge exposed through the curved slot will maintain the curved leading edge on the depth gauge and consequently maintain the desired camming effect. Second, the curved end acts as a locater. As seen in FIG. 4 the slot is only wide enough for the combined width of the center link and the cutting link. The curved end of the tool on the side of the slot opposite to the depth gauge hooks over the end of the side link opposite to the cutting link and this prevents longitudinal movement of the tool.

Figure 5:
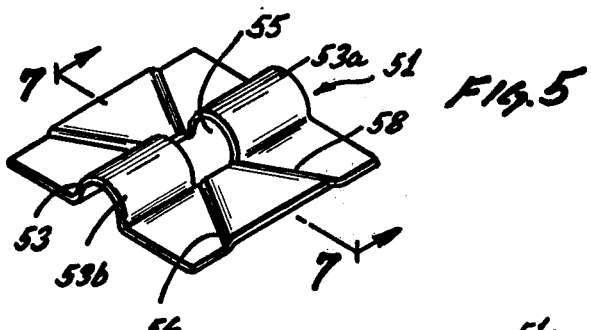
FIG. 5 is a perspective view of an alternate embodiment of the invention.
Figure 7:
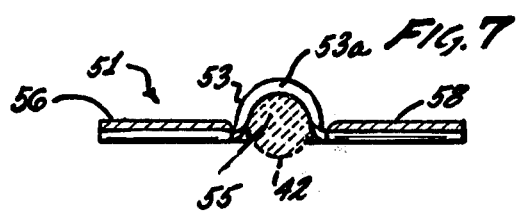
FIG. 7 is a view taken on line 7—7 of FIG. 5.
Figure 6:
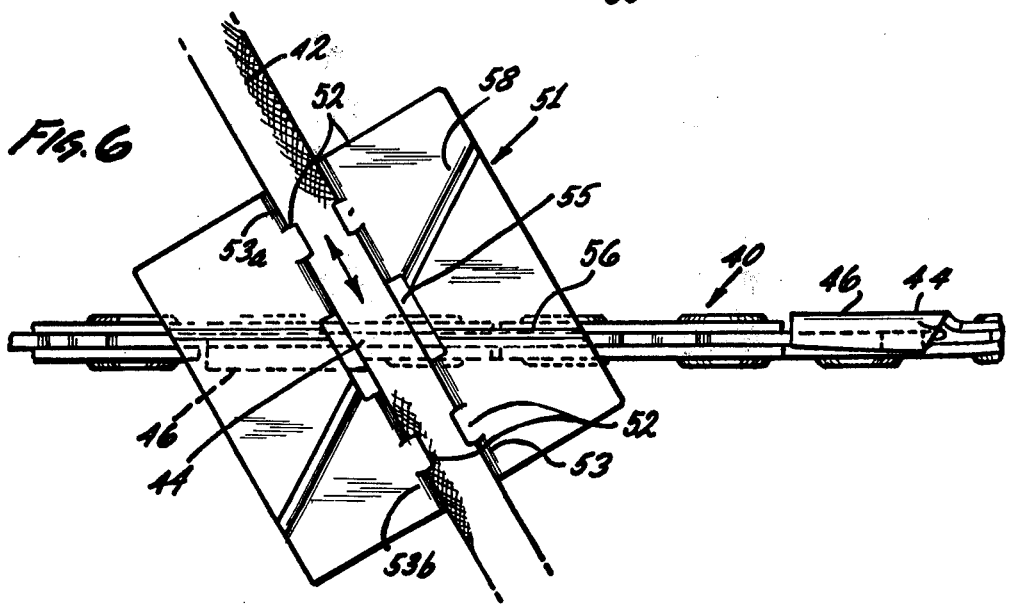
FIG. 6 is a top view of the embodiment of FIG. 5 illustrating it in operation.

FIGS. 5 through 7 illustrate a tool 51 that functions merely as a file guide. Thus in the same manner as described above, a file 42 is nested in an intermediate loop section 53 and the tool and file are mounted over the saw chain 40 with lugs 53a and 53b straddling the chain and with opening 55 exposing the cutting edge 44 of the cutting link 46 to the file. Guide links 56 and 58 (formed by crimping the metal plate) aid the user in lining up the file. The file is then worked back and forth as indicated by directional arrows 60 to sharpen the cutting edge 44. Again tabs 52 hold the file against being lifted out of the logs.

Whereas two embodiments of the invention are specifically described in the foregoing, it will be understood that numerous variations can be made by those skilled in the art without departing from the invention which is specifically defined in the claims appended hereto.

What I claim is:

1. A file guide for a saw chain cutting link including a cutter and depth gauge separated by a gullet comprising: a sheet metal plate including first and second spaced flat plate sections lying in a common plane, an intermediate section joining said flat sections and forming a semi-circular loop depending from one side of the plate, said loop having a center portion removed and the remaining end portions forming aligned guide lugs, said first and second flat sections forming a reference plane on said one side of the plate with said first and second flat sections adapted to abut respectively the depth gauge and cutter of the cutting link, said lug portions adapted to straddle a saw chain while providing a guide channel for a file to be inserted in the gullet between the cutter and depth gauge and to guide the file in a predetermined orientation against the cutting edge of the cutter.

2. A file guide for a saw chain cutting link as defined in claim 1 wherein the outer end edge of one of the flat sections intersects with a side edge at an acute angle to form a point for cleaning a chain saw guide bar slot.

3. A file guide for a saw chain cutting link as defined in claim 1 wherein the outer end of one of the flat sections is offset in a direction opposite to the depending loop section, said offset being provided as the desired depth setting of the depth gauge of the cutting link, said outer end beyond the offset being curved in the same direction as the offset, and a slot in the extreme end for receiving a depth gauge when the flat sections on the side opposite said reference plane are abutted against the top of the next two successive cutters following said depth gauge to provide the reference for establishing the depth gauge setting.

4. A file guide for a saw chain cutting link as defined in claim 1 wherein holding tabs are formed in the intermediate loop section to further surround a file in the guide channel and restrict such file from being removed by lifting it out of the channel.

5. A file guide for a saw chain cutting link as defined in claim 1 wherein guide lines are formed in the side of the flat sections opposite to the reference plane to orient the guide channel relative to the cutting edge of the saw chain.

* * * * *